(12) United States Patent
O'Brien

(10) Patent No.: US 6,386,969 B1
(45) Date of Patent: May 14, 2002

(54) GARAGE VENTILATION SYSTEM

(76) Inventor: Robert D. O'Brien, 3507 57th Avenue Dr. West, Bradenton, FL (US) 34210

( * ) Notice: Subject to any disclaimer, the term of this patent is extended or adjusted under 35 U.S.C. 154(b) by 0 days.

(21) Appl. No.: 09/960,047

(22) Filed: Sep. 21, 2001

(51) Int. Cl.[7] .................................................. E06B 7/02
(52) U.S. Cl. ........................................ 454/195; 454/343
(58) Field of Search .............................. 454/195, 239, 454/253, 343

(56) References Cited

U.S. PATENT DOCUMENTS

| | | | |
|---|---|---|---|
| 3,927,709 A | 12/1975 | Anderson et al. | |
| 4,141,403 A | 2/1979 | Church | |
| 4,770,087 A | 9/1988 | Danley et al. | |
| 5,846,127 A | * 12/1998 | Kile | ............. 454/195 |
| 5,947,814 A | 9/1999 | Czeck et al. | |
| 5,955,031 A | * 9/1999 | King, Jr. | ............. 340/522 |
| 6,036,595 A | * 3/2000 | Vole | ............. 340/632 |
| 6,110,038 A | 8/2000 | Stern | |
| D431,487 S | 10/2000 | Rienks | |

* cited by examiner

*Primary Examiner*—Harold Joyce
*Assistant Examiner*—Derek S. Boles

(57) ABSTRACT

A garage ventilation system for ventilating fumes from a garage. The garage ventilation system includes a garage door having a first side and a second side. A housing has a generally open front wall, a back wall and a peripheral wall extending between the front and back walls. The back wall has a plurality of openings therein. The front wall has a peripheral edge. The housing is positioned in an aperture in the garage door. A plurality of fans is mounted in the housing and each is directed toward the front wall such that the fans draw air into the housing through the back wall and expel air outward through the front wall. A power supply is operationally coupled to the fans. A control is operationally coupled to the fans. A plurality of switches is operationally coupled to the control for manually turning the fans on or off.

13 Claims, 5 Drawing Sheets

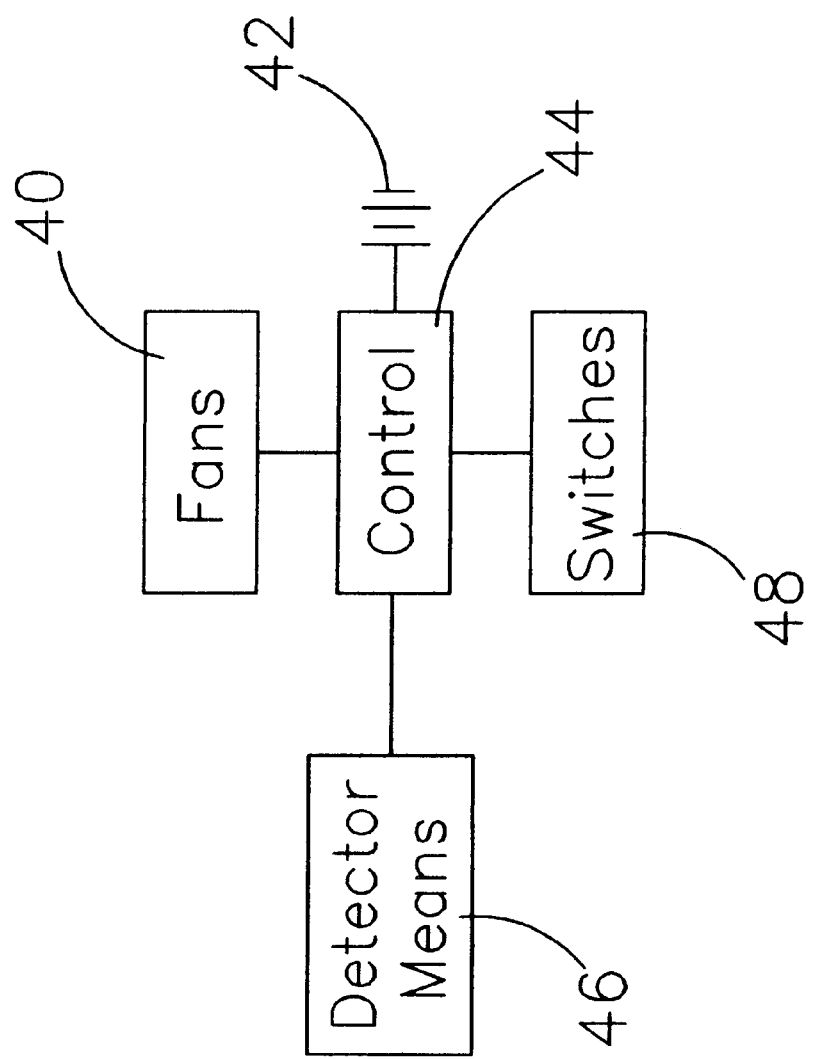

GARAGE VENTILATION SYSTEM

BACKGROUND OF THE INVENTION

1. Field of the Invention

The present invention relates to ventilation devices and more particularly pertains to a new garage ventilation system for ventilating fumes and toxins from a garage or other enclosed area.

2. Description of the Prior Art

The use of ventilation devices is known in the prior art. More specifically, ventilation devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,770,087; 4,141,403; 3,927,709; 5,947,814; 6,110,038; U.S. Des. Pat. No. 431,487.

While these devices fulfill their respective, particular objectives and requirements, the aforementioned patents do not disclose a new garage ventilation system. The inventive device includes a garage door having a first side and a second side. A housing has a generally open front wall, a back wall and a peripheral wall extending between the front and back walls. The back wall has a plurality of openings therein and preferably comprises a mesh screen. The front wall has a peripheral edge. The housing is positioned in an aperture in the garage door. A plurality of fans is mounted in the housing and each is directed toward the front wall such that the fans draw air into the housing through the back wall and expel air outward through the front wall. A power supply is operationally coupled to the fans. A control is operationally coupled to the fans. A plurality of switches is operationally coupled to the control for manually turning the fans on or off.

In these respects, the garage ventilation system according to the present invention substantially departs from the conventional concepts and designs of the prior art, and in so doing provides an apparatus primarily developed for the purpose of ventilating fumes and toxins from a garage or other enclosed area.

SUMMARY OF THE INVENTION

In view of the foregoing disadvantages inherent in the known types of ventilation devices now present in the prior art, the present invention provides a new garage ventilation system construction wherein the same can be utilized for ventilating fumes and toxins from a garage or other enclosed area.

The general purpose of the present invention, which will be described subsequently in greater detail, is to provide a new garage ventilation system apparatus and method which has many of the advantages of the ventilation devices mentioned heretofore and many novel features that result in a new garage ventilation system which is not anticipated, rendered obvious, suggested, or even implied by any of the prior art ventilation devices, either alone or in any combination thereof.

To attain this, the present invention generally comprises a garage door having a first side and a second side. A housing has a generally open front wall, a back wall and a peripheral wall extending between the front and back walls. The back wall has a plurality of openings therein and preferably comprises a mesh screen. The front wall has a peripheral edge. The housing is positioned in an aperture in the garage door. A plurality of fans is mounted in the housing and each is directed toward the front wall such that the fans draw air into the housing through the back wall and expel air outward through the front wall. A power supply is operationally coupled to the fans. A control is operationally coupled to the fans. A plurality of switches is operationally coupled to the control for manually turning the fans on or off.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new garage ventilation system apparatus and method which has many of the advantages of the ventilation devices mentioned heretofore and many novel features that result in a new garage ventilation system which is not anticipated, rendered obvious, suggested, or even implied by any of the prior art ventilation devices, either alone or in any combination thereof.

It is another object of the present invention to provide a new garage ventilation system which may be easily and efficiently manufactured and marketed.

It is a further object of the present invention to provide a new garage ventilation system which is of a durable and reliable construction.

An even further object of the present invention is to provide a new garage ventilation system which is susceptible of a low cost of manufacture with regard to both materials and labor, and which accordingly is then susceptible of low prices of sale to the consuming public, thereby making such garage ventilation system economically available to the buying public.

Still yet another object of the present invention is to provide a new garage ventilation system which provides in the apparatuses and methods of the prior art some of the advantages thereof, while simultaneously overcoming some of the disadvantages normally associated therewith.

Still another object of the present invention is to provide a new garage ventilation system for ventilating fumes and toxins from a garage or other enclosed area.

Yet another object of the present invention is to provide a new garage ventilation system which includes a garage door having a first side and a second side. A housing has a generally open front wall, a back wall and a peripheral wall extending between the front and back walls. The back wall has a plurality of openings therein and preferably comprises a mesh screen. The front wall has a peripheral edge. The housing is positioned in an aperture in the garage door. A plurality of fans is mounted in the housing and each is directed toward the front wall such that the fans draw air into the housing through the back wall and expel air outward through the front wall. A power supply is operationally coupled to the fans. A control is operationally coupled to the fans. A plurality of switches is operationally coupled to the control for manually turning the fans on or off.

Still yet another object of the present invention is to provide a new garage ventilation system that may be retrofitted to existing doors.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic view of the present invention.

DESCRIPTION OF THE PREFERRED EMBODIMENT

Figure 1:
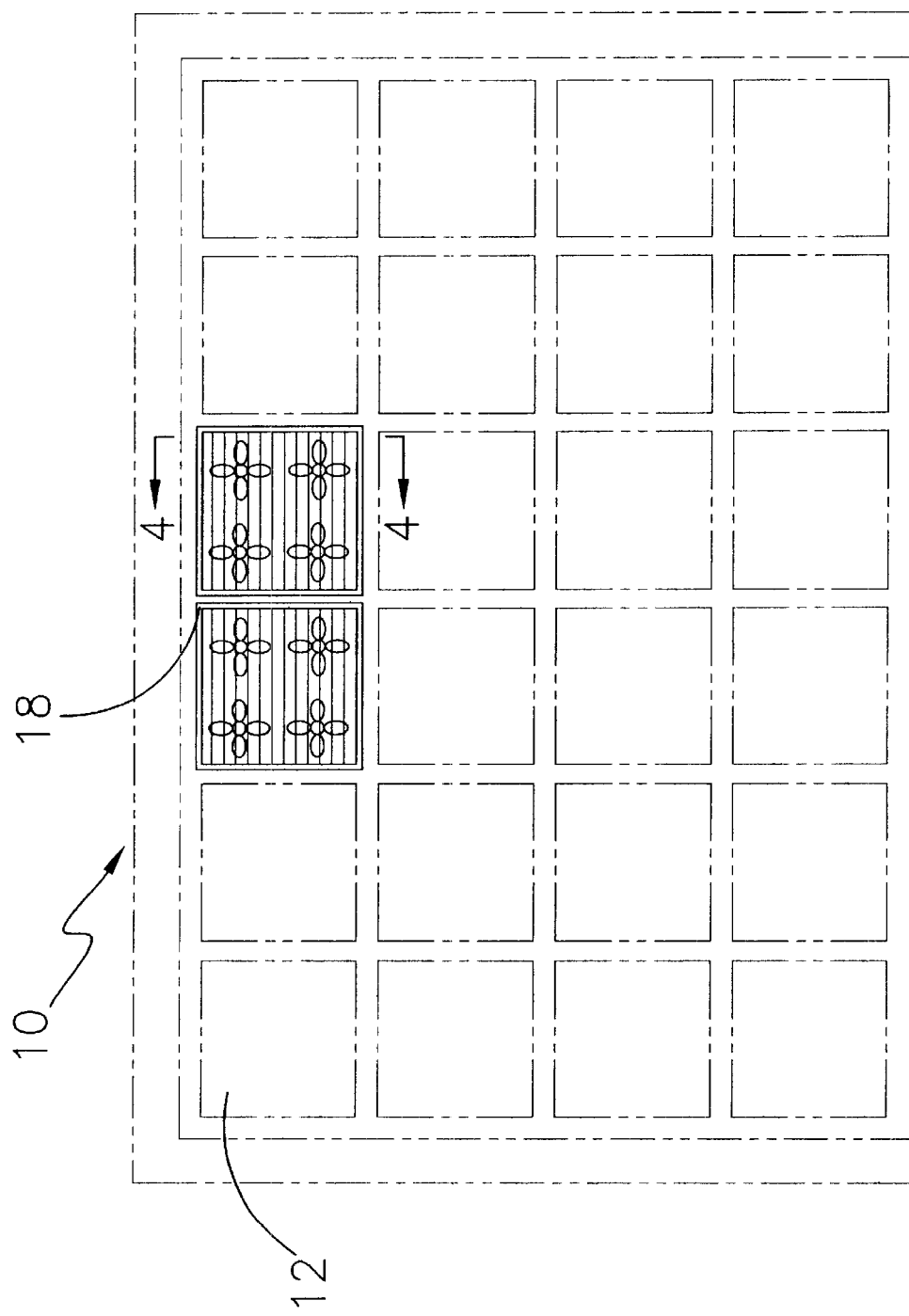
FIG. 1 is a schematic front view of a new garage ventilation system according to the present invention.
Figure 2:
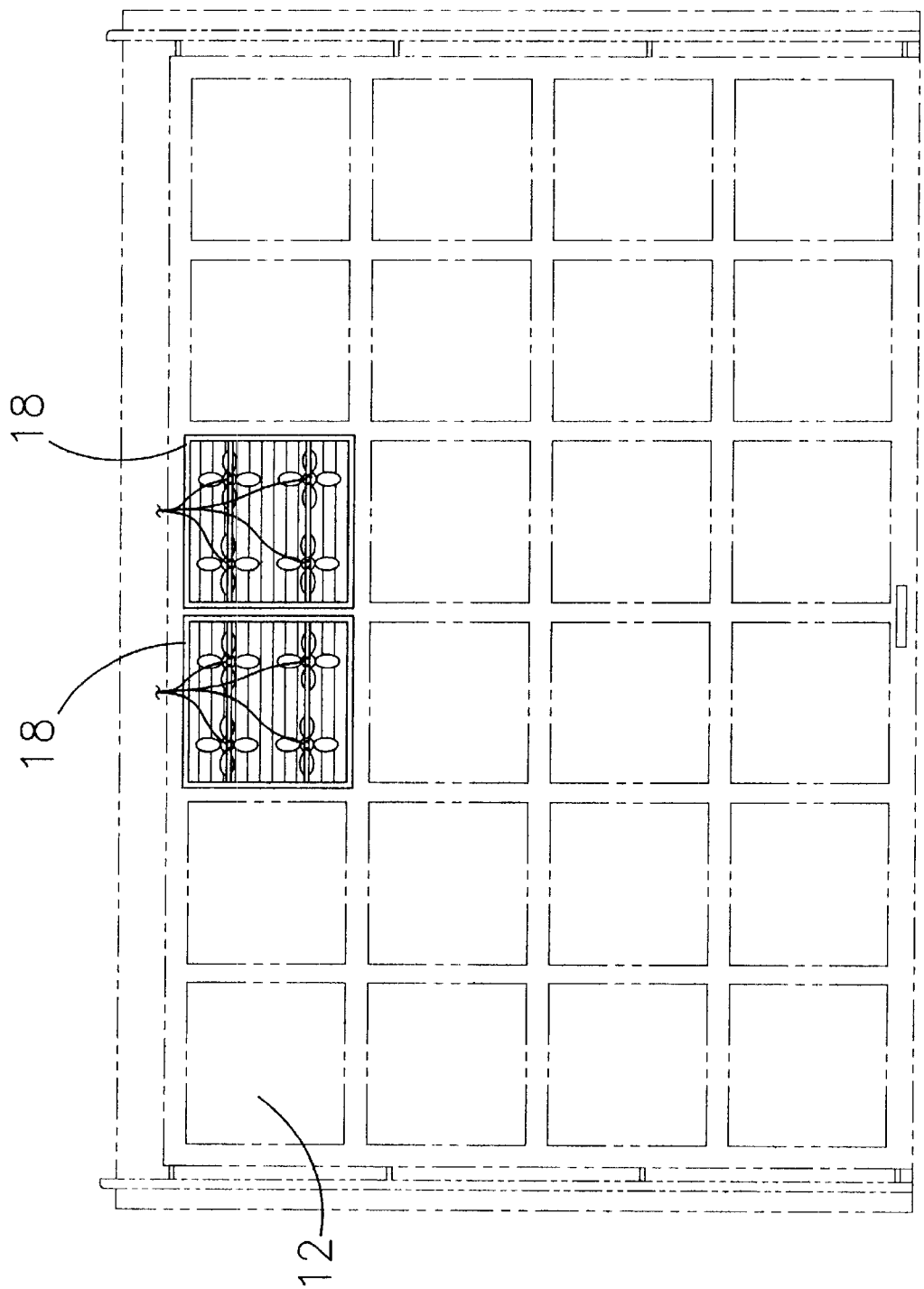
FIG. 2 is a schematic front view of the present invention.
Figure 3:
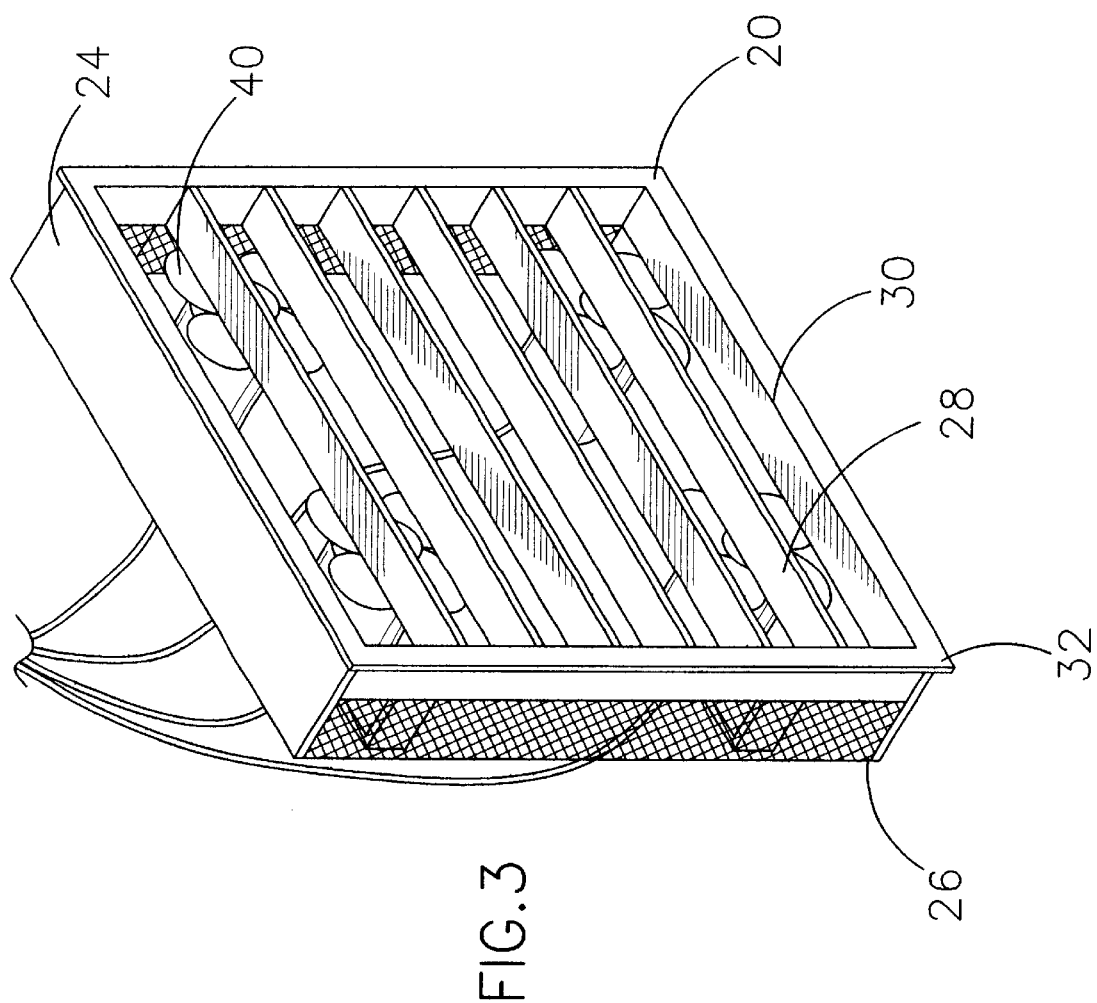
FIG. 3 is a schematic perspective view of the present invention.
Figure 4:
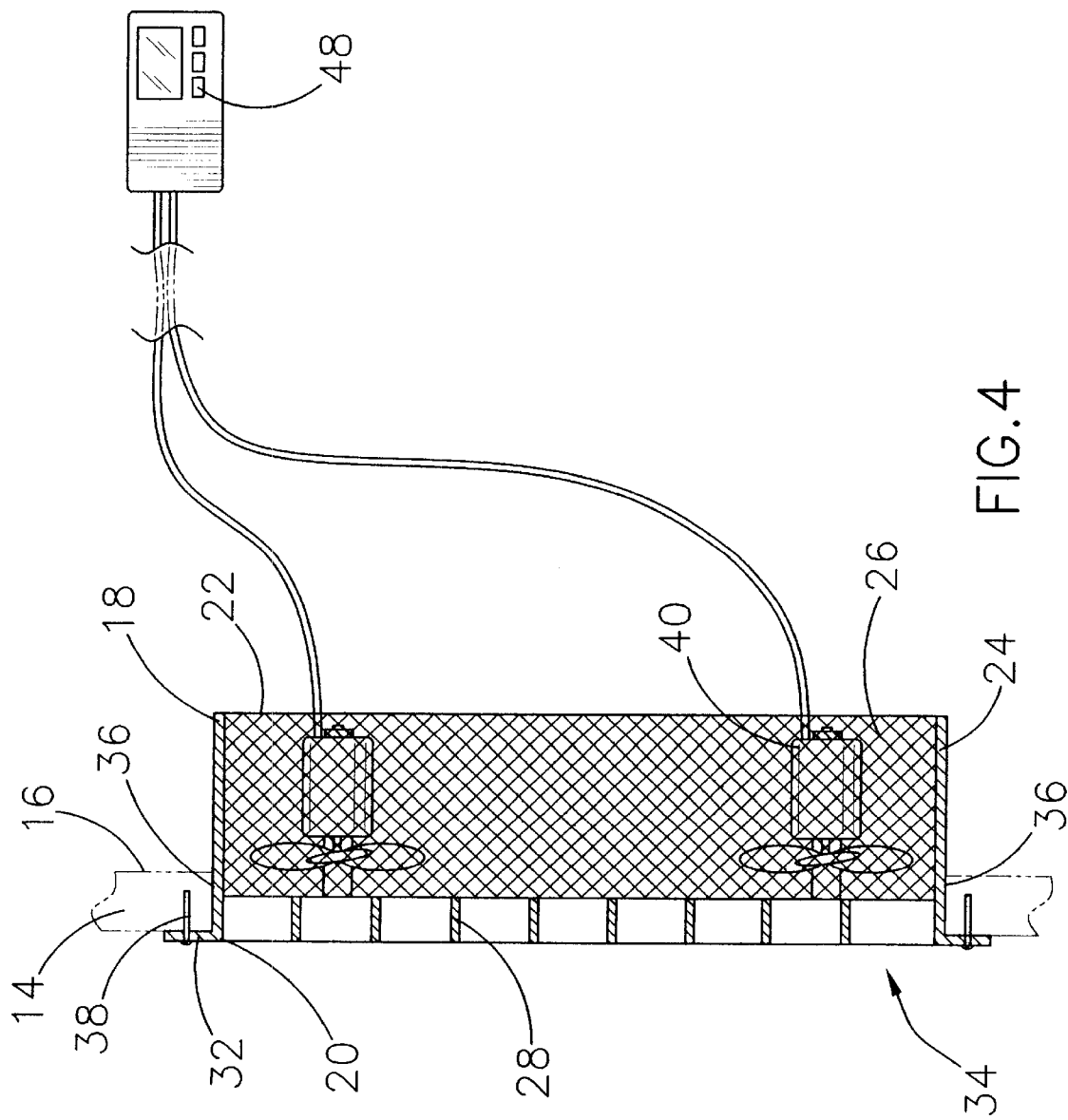
FIG. 4 is a schematic cross-sectional view of the present invention.

With reference now to the drawings, and in particular to FIGS. 1 through 5 thereof, a new garage ventilation system embodying the principles and concepts of the present invention and generally designated by the reference numeral 10 will be described.

As best illustrated in FIGS. 1 through 5, the garage ventilation system 10 generally comprises a garage door 12 having a first side 14 and a second side 16. A housing 18 has a front wall 20, a back wall 22 and a peripheral wall 24 extending between the front 20 and back 22 walls. The back wall 22 has a plurality of openings 26 therein. Ideally the peripheral wall 24 has the openings 26 therein as well. The back and peripheral walls preferably comprise a wire mesh material. The front wall 20 comprises a louver having a plurality of rotatable slats 28 therein for selectively opening and closing the housing 18. The front wall 20 has a peripheral edge 30 having a generally rectangular shape. A peripheral lip 32 is attached to the peripheral edge 30 and extends outwardly away from the front wall 20. The housing 18 is positioned in an aperture 34 in the garage door 12 such that the peripheral wall 24 of the housing 18 is abutting an edge 36 of the aperture 34 and the peripheral lip 32 is abutting the first side 14 of the garage door 12. It should be noted that multiple housings 18 may be placed in the garage door 12 and that the housing may be placed in other types of doors besides garage doors 12.

A plurality of fasteners 38 extends through the peripheral lip 32 and into the garage door 12 for removably fastening the housing 18 to the garage door 12.

A plurality of fans 40 is mounted in the housing 18 and is directed toward the front wall 20 such that the fans 40 draw air into the housing 18 through the back wall 22 and expel air outward through the front wall 20. Each of the fans 40 preferably comprises an electric fan. A power supply 42 is operationally coupled to each of the fans 40.

A control 44 is operationally coupled to the fans 40. The control 44 preferably includes a detector means 46 for detecting carbon monoxide. The control 44 turns on the fans when the detector means 46 detects a respectively high concentration of carbon monoxide. Such detectors are currently used in houses to alarm persons of high concentrations of carbon monoxide. Also envisioned is a detector means 46 which detects heat, smoke and other toxins such as fuel fumes. A plurality of switches 48 is operationally coupled to the control 44 for manually turning the fans 40 on or off.

Alternatively, the housing 18 may be positioned in an existing garage door 12 by making the aperture 34 in the garage door 12 and mounting the housing 18 in the garage door 12.

In use, the device is used to ventilate garages and may also be used for cooling down the interior temperature of a garage. The device preferably used an automatic detector means which will automatically ventilate a garage should levels of smoke or carbon monoxide reach unacceptable levels. The switches may be used to manually turn on the fans.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An exhaust system for a garage comprising:
   a garage door having a first side and a second side;
   a housing having a generally open front wall, a back wall and a peripheral wall extending between said front and back walls, said back wall having a plurality of openings therein, said front wall having a peripheral edge, said housing being positioned in an aperture in said garage door;
   a plurality of fans being mounted in said housing and being directed toward said front wall such that said fans draw air into said housing through said back wall and expel air outward through said front wall;
   a power supply being operationally coupled to said fans; and
   a control being operationally coupled to said fans, a plurality of switches being operationally coupled to said control for manually turning said fans on or off.

2. The exhaust system as in claim 1, wherein said front wall comprises a louver having a plurality of rotatable slats therein for selectively opening and closing said housing.

3. The exhaust system as in claim 1, further including a peripheral lip being attached to said peripheral edge and extending outwardly away from said front wall, said housing being positioned in an aperture in said garage door such that said peripheral wall of said housing is abutting an edge of said aperture and said peripheral lip is abutting said first side of said garage door, each of a plurality of fasteners extending through said peripheral lip and into said garage door for removably fastening said housing to said garage door.

4. The exhaust system as in claim 1, wherein said control includes a detector means for detecting carbon monoxide, wherein said control turns on said fans when said detector means detects a respectively high concentration of carbon monoxide.

5. An exhaust system for a garage comprising:
   a garage door having a first side and a second side;
   a housing having a front wall, a back wall and a peripheral wall extending between said front and back walls, said back wall having a plurality of openings therein, said front wall comprising a louver having a plurality of rotatable slats therein for selectively opening and closing said housing, said front wall having a peripheral edge having a generally rectangular shape, a peripheral lip being attached to said peripheral edge and extending outwardly away from said front wall, said housing being positioned in an aperture in said garage door such that said peripheral wall of said housing is abutting an edge of said aperture and said peripheral lip is abutting said first side of said garage door;
   a plurality of fasteners extending through said peripheral lip and into said garage door for removably fastening said housing to said garage door;
   a plurality of fans being mounted in said housing and being directed toward said front wall such that said fans draw air into said housing through said back wall and expel air outward through said front wall, each of said fans comprising an electric fan;
   a power supply being operationally coupled to said fans;
   a control being operationally coupled to said fans, said control including a detector means for detecting carbon monoxide, wherein said control turns on said fans when said detector means detects a respectively high concentration of carbon monoxide, a plurality of switches being operationally coupled to said control for manually turning said fans on or off.

6. An exhaust device for positioning in an aperture extending through a first and second side of a garage, said device comprising:
   a housing having a generally open front wall, a back wall and a peripheral wall extending between said front and back walls, said back wall having a plurality of openings therein, said front wall having a peripheral edge, said housing being positioned in an aperture in said garage door;
   a plurality of fans being mounted in said housing and being directed toward said front wall such that said fans draw air into said housing through said back wall and expel air outward through said front wall, each of said fans comprising an electric fan;
   a power supply being operationally coupled to said fans; and
   a control being operationally coupled to said fans, a plurality of switches being operationally coupled to said control for manually turning said fans on or off.

7. The exhaust system as in claim 6, wherein said front wall comprises a louver having a plurality of rotatable slats therein for selectively opening and closing said housing.

8. The exhaust system as in claim 7, further including a peripheral lip being attached to said peripheral edge and extending outwardly away from said front wall, said housing being positioned in an aperture in said garage door such that said peripheral wall of said housing is abutting an edge of said aperture and said peripheral lip is abutting said first side of said garage door, each of a plurality of fasteners extending through said peripheral lip and into said garage door for removably fastening said housing to said garage door.

9. The exhaust system as in claim 8, wherein said control includes a detector means for detecting carbon monoxide, wherein said control turns on said fans when said detector means detects a respectively high concentration of carbon monoxide.

10. The exhaust system as in claim 6, further including a peripheral lip being attached to said peripheral edge and extending outwardly away from said front wall, said housing being positioned in an aperture in said garage door such that said peripheral wall of said housing is abutting an edge of said aperture and said peripheral lip is abutting said first side of said garage door, each of a plurality of fasteners extending through said peripheral lip and into said garage door for removably fastening said housing to said garage door.

11. The exhaust system as in claim 6, wherein said control includes a detector means for detecting carbon monoxide, wherein said control turns on said fans when said detector means detects a respectively high concentration of carbon monoxide.

12. The exhaust system as in claim 7, wherein said control includes a detector means for detecting carbon monoxide, wherein said control turns on said fans when said detector means detects a respectively high concentration of carbon monoxide.

13. The exhaust system as in claim 10, wherein said control includes a detector means for detecting carbon monoxide, wherein said control turns on said fans when said detector means detects a respectively high concentration of carbon monoxide.

* * * * *